UNITED STATES PATENT OFFICE 1,996,199

PROCESS OF PRODUCING THEINE-FREE TEA

Theodor Grethe, Hamburg, Germany

No Drawing. Application June 1, 1932, Serial No. 614,848. In Germany June 3, 1931

4 Claims. (Cl. 99—11)

The suggestion has already been made to produce a tea free from theine by extracting the aromatic bases from the tea by means of a volatile solvent, splitting up the theine salts in the residue by means of acids, alkali or suitable salts, extracting the theine by means of a volatile solvent and then saturating the theine-free product with the solution of aromatic bases. Tea-leaves consisting of extremely sensitive materials, such a treatment would cause so great an alteration in their taste and aroma that this process could not lead to any satisfactory result.

Furthermore no satisfactory tea poor in theine can be produced by a further known process, in which the extraction of the aromatic bases and the theine are effected in a centrifugal machine, after which the aromatic bases are freed from theine and given back to the theine-free residues. As the extraction takes place from the dry leaves it is not possible to remove all the theine, besides which the quality of the tea is greatly influenced.

Though one might expect to be able to extract the theine from the tea by treating it with one of the well-known alkaloid solvents and though in the production of caffeine-free coffee from the raw coffee bean the extraction is done with suitable solvents, the coffee beans being first treated with high-pressure steam or soaked in water for some length of time, it was by no means a self-evident fact that tea could be freed from theine by this same process, because it has quite different properties and a process suitable for the treatment of coffee would never lead to a useful result.

A very material factor is that the tea must be treated in such a manner as to avoid alteration in its taste or its outward appearance. In particular it is of great importance that the leaves should retain their natural reddish-brown colour after cooking, and this would not be the case, for example, if the tea were dried without special precautions, even at a low temperature. In such a case the leaves would assume a darker colour after cooking, and this greatly diminishes the value of the tea.

It has now been found that tea can be rendered entirely or almost entirely free from theine without detrimental effects if done in the following manner.

First of all the tea leaves are well moistened with water and then subjected to an extraction process, a solvent being used which boils at a low temperature. For this purpose one of the well-known solvents, such as methylene dichloride $CH_2Cl_2$, chloroform, benzole, etc. or a mixture of them, may be used. When the extraction process is over and the majority of the solvent has left the tea, the latter is subjected to a special process to remove the rest of the solvent and any water it may still contain, this process being carried out in such a way as to avoid subjecting the tea to temperatures of more than 65° C. (abt. 150° Fahr.). This process consists in conducting through the tea-leaves after the extraction process warm air or warm inert gas, this being done at reduced air pressure if necessary. This treatment is repeated once or several times after the tea has been well moistened with water. Hereby it is of importance that the temperature should not exceed 65° C. (149° Fahr.) and preferably 60° C. (140° Fahr.). In this way also solvents such as benzole, with boiling points above 65° C., can be fully removed.

To carry out the invention the tea-leaves are to be well moistened with water. Then they are to be extracted with methylene dichloride $CH_2Cl_2$ or other solvent, which can be done at room temperature or by slightly heating the solvent. In 2½ to 3 hours the majority of the theine has been extracted; the theine contents are then only about .1%. If the process of extraction is then continued for a comparatively short time the whole of the theine is extracted. The solvent is then separated from the tea-leaves and the latter heated to cause the majority of the methylene dichloride $CH_2Cl_2$ to evaporate. When this has been done warm air is passed through the tea-leaves for some time, but so that they are not heated beyond 65°. Then the tea-leaves are again moistened with water and warm air once more passed through them under the same conditions as before, till the tea is quite dry.

If solvents such as benzole are used, which cannot be evaporated at 60° to 65° C., the solvent is separated from the tea-leaves only by mechanical means, after which warm air is passed through. In such cases it is necessary for the tea to be moistened with water several times, say two or three times, during the removal of the solvent, in order to drive off the solvent entirely.

Having now described my invention, what I claim as new and desire to secure by Letters Patent, is:

1. The process of producing tea in the usual dry leaf form suitable for infusion but containing less than its original theine content, which consists in first moistening the tea leaves with cold water, subjecting said leaves to the action of an organic solvent of theine, removing the greater part of said solvent and finally removing the remainder of said solvent by the action of heated gaseous fluid, said leaves being moistened with water at least once during said final removal stage.

2. The process of producing tea in the usual dry leaf form suitable for infusion but containing less than its original theine content, which consists in first moistening the tea leaves with cold water, subjecting said leaves to the action of an organic solvent of theine such as methylene dichloride which does not appreciably affect the aromatic constituents of the leaves, removing the greater part of said solvent by heat and finally removing the remainder of said solvent by the action of heated gaseous fluid while maintaining said leaves at a temperature not exceeding about 65 degrees C., said leaves being again moistened with water at least once during said final removal stage.

3. The process of producing tea in the usual dry leaf form suitable for infusion but containing less than its original theine content, which consists in first moistening the tea leaves with water without producing an infusion thereof, subjecting said tea leaves to the action of an organic solvent of theine for a period of not exceeding approximately 3 hours, mechanically removing the greater part of said solvent and finally removing the remainder of said solvent by the action of heated gaseous fluid, while maintaining said leaves at a temperature not exceeding about 65 degrees C., said leaves being again moistened with water at least once during said final removal stage.

4. The process of producing tea in the usual dry leaf form suitable for infusion but containing less than its original theine content, which consists in first moistening the tea leaves with water without producing an infusion thereof, subjecting said leaves to the action of an organic solvent of theine for a period of time insufficient appreciably to dissolve the aromatic constituents, removing the greater part of said solvent and finally removing the remainder of said solvent by passing through said leaves heated gaseous fluid without raising the temperature of said leaves beyond about 65 degrees C., and under a pressure less than atmospheric pressure, said leaves being again moistened with water at least once during said final removal stage.

THEODOR GRETHE.